United States Patent [19]

Elfert et al.

[11] 4,217,227

[45] Aug. 12, 1980

[54] SEMIPERMEABLE MEMBRANES OF COPOLYAMIDES

[75] Inventors: Klaus Elfert, Krefeld; Gerhard D. Wolf, Dormagen; Francis Bentz, Cologne; Hans E. Kunzel, Dormagen, all of Fed. Rep. of Germany

[73] Assignee: Bayer Aktiengesellschaft, Leverkusen, Fed. Rep. of Germany

[21] Appl. No.: 920,271

[22] Filed: Jun. 29, 1978

Related U.S. Application Data

[63] Continuation of Ser. No. 747,211, Dec. 3, 1976, abandoned.

[30] Foreign Application Priority Data

Dec. 6, 1975 [DE] Fed. Rep. of Germany ....... 2554932

[51] Int. Cl.$^2$ .............................................. B01D 31/00
[52] U.S. Cl. ................................ 210/500 M; 521/147
[58] Field of Search .............. 210/23 H, 500 M, 23 F; 264/41, 209, 216, 49; 521/61, 62, 147; 528/176, 184; 428/474

[56] References Cited

U.S. PATENT DOCUMENTS

| | | | |
|---|---|---|---|
| 3,560,440 | 2/1971 | Gilch et al. | 260/47 |
| 3,567,632 | 3/1971 | Richter et al. | 210/500 M |
| 3,733,308 | 5/1973 | Bach | 260/65 |
| 3,801,545 | 4/1974 | Kunzel et al. | 260/47 CZ |
| 3,862,088 | 1/1975 | Wolf et al. | 260/47 CZ |
| 3,926,923 | 12/1975 | Preston | 260/78 R |
| 3,993,625 | 11/1976 | Kurihara et al. | 260/47 CP |
| 4,086,215 | 4/1978 | Kurihara et al. | 260/78 R |
| 4,100,238 | 7/1978 | Shinomura | 264/49 |

OTHER PUBLICATIONS

Smith et al., "Convective Transport in a Batch Dialyzer", Chem. Eng. Prog. Symp. Series, No. 84, vol. 64, 1968, pp. 45-58.

*Primary Examiner*—Thomas G. Wyse
*Assistant Examiner*—David R. Sadowski
*Attorney, Agent, or Firm*—Connolly and Hutz

[57] ABSTRACT

The invention relates to semipermeable membranes with a water absorption capacity of from 4.5 to 10% by weight preferably from 4.5 to 8% by weight as measured on approximately 40$\mu$ thick symmetrical films at room temperature and 65% relative air humidity, with a throughflow of at least 80 1/m$^2$d for a desalination level of at least 85% and consisting of a fully aromatic copolyamide with a relative viscosity of $\geq 1,4$, as measured on a 0.5% N-methyl pyrrolidone solution at a temperature of 20° C.

13 Claims, No Drawings

SEMIPERMEABLE MEMBRANES OF COPOLYAMIDES

This is a Continuation, of application Ser. No. 747,211, filed Dec. 3, 1976, now abandoned.

This invention relates to semipermeable membranes of fully aromatic copolyamides which are particularly suitable for inverse osmosis and ultrafiltration, and to the production of these membranes.

Inverse osmosis and ultrafiltration are mass separation processes which are particularly economical by virtue of the low energy costs involved, because in such forms of mass separation, in contrast to separation by distillation, there is no phase change of the solvent, and temperatures around ambient temperature are normally applied.

The principle of inverse osmosis has been known for some time. In inverse osmosis, solvents migrate from a solution of relatively high concentration through a semipermeable membrane into a solution of lower concentration under the effect of an applied pressure which is above the osmotic pressure of the system. In this way, it is possible for example to separate dissolved substances from the solvent.

Examples of the technical application of this separation process are the desalination of sea water or brackish water, the purification of contaminated water for the production of drinking water or industrial water, also the concentration, removal or recovery of a variety of different substances from aqueous solutions, for example the concentration of food stuffs or the separation or concentration of biological or pharmaceutical products.

Although numerous installations for the industrial application of inverse osmosis and ultrafiltration are already in operation, the provision of suitable membranes is still one of the main problems of these processes. Numerous polymers have been tested for their suitability as a membrane material. They have to satisfy certain requirements in regard to their permeability and their selectivity and, in addition, have to be chemically, thermally and mechanically stable. Membranes of cellulose acetate and of aromatic polyamides have hitherto mainly been used for commercial purposes. It was only as a result of the development of the asymmetrical cellulose acetate membranes by Loeb and Sourirajan (cf. U.S. Pat. No. 3,133,132) that it became possible to produce membranes with satisfactory properties, i.e. high throughflow rates coupled with a high separation capacity. However, cellulose acetate membranes show certain disadvantages in regard to their chemical and thermal stability. They are readily hydrolysed under acid or alkaline conditions and are degraded by microorganisms. This means that their filtration properties gradually deteriorate which restricts the useful life and, hence, the general serviceability of cellulose acetate membranes. In addition, the membrane is compressed under the effect of pressure applied, resulting in a reduction in the throughflow rate.

Aromatic polyamides, of the type described for example in German Offenlegungsschrift Nos. 1,941,022 and 1,941,932 and in U.S. Pat. No. 3,567,632, are also suitable for the production of asymmetrical semipermeable membranes. In particular, they are superior to the cellulose acetate membranes in their resistance to chemical and thermal influences. One of their disadvantages, however, is their lower permeability to water in comparison with cellulose acetate membranes.

The permeability to water of a plastics material is related to its water absorption capacity. Cellulose acetate which as a membrane material is characterised by high flow rates coupled with high selectivity, has a water content of from 10 to 15%. By contrast, poly-m-phenylene isophthalic acid amide has a water content of from 3.8 to 4%, as measured on an approximately 40μ thick symmetrical film, and accordingly has a low throughflow rate.

Another of the nitrogen-containing polycondensates commonly used in membrane technology is poly-(2,2'-(m-phenylene)-5,5'-bis-benzimidazole) which has a water absorption capacity of 11 to 13% (as measured on filaments at room temperature/65% relative air humidity) and, as expected, a high throughflow rate. In contrast to cellulose acetate, however, this condensate has only very limited selectivity. In the case of N-containing condensates, therefore, the impression is formed that high throughflow rates are coupled with low selectivities.

The object of the present invention is to obviate the disadvantages referred to above and to develop membranes with high throughflow rates coupled with high selectivity.

It has surprisingly been found that it is possible to produce from certain copolyamides with an increased water absorption capacity polymer membranes which thus show increased permeability to water coupled with very high selectivity.

Accordingly, the present invention provides semipermeable membranes with a water absorption capacity of from 4.5 to 10% by weight, preferably from 4.5 to 8% by weight, as measured on approximately 40μ thick symmetrical films at room temperature and 65% relative air humidity, with a throughflow of at least 80 $l/m^2d$ for a desalination level of at least 85% and consisting of a fully aromatic copolyamide with a relative viscosity of $\geq 1.4$, as measured on a 0.5% N-methyl pyrrolidone solution at a temperature of 20° C.

In a preferred embodiment, the invention provides semipermeable membranes of the copolyamide described above having a throughflow of from 85 to 200 $l/m^2d$ for a desalination level of 95 to 99.6%. The throughflow values and desalination levels are measured in a pressure osmosis apparatus, in which a 3.5% NaCl-solution is pumped in a circuit past the membrane surface at room temperature under a pressure of 110 bars at a rate of 15 l/h.

Particularly preferred semipermeable membranes have a water absorption capacity of from 4.5 to 10% by weight, preferably from 4.5 to 8% by weight, as measured on approximately 40μ thick symmetrical films at room temperature and at 65% relative air humidity, consisting of a fully aromatic copolyamide of (A) 10 to 90, preferably 50 to 85 mole percent of units corresponding to the formula (I)

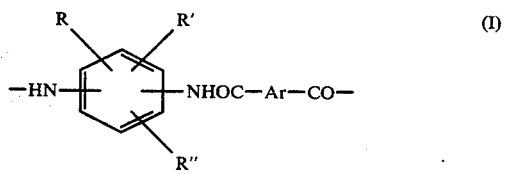

in which
R, R' and R'' represent hydrogen, $C_{1-4}$-alkyl, preferably methyl, or halogen and Ar represents an optionally alkyl- or halogen-substituted bivalent aromatic radical, preferably phenylene, naphthylene, biphenylene or a radical of the formula

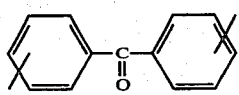

and of (B) 10 to 90, preferably 15 to 50 mole % of units corresponding to formulae II, III or IV below

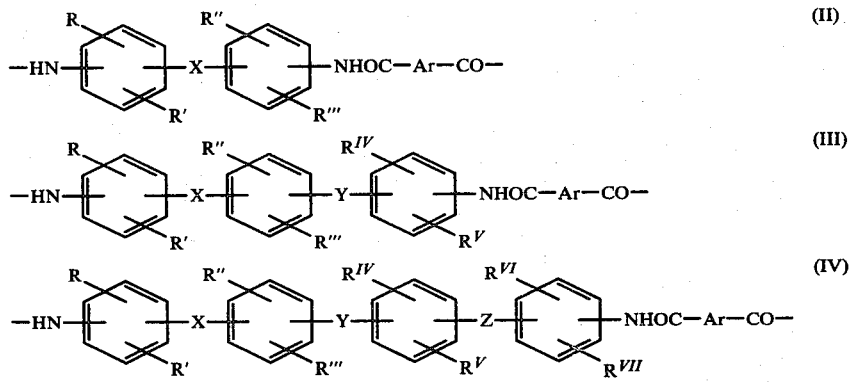

in which
R, R', R", R''', $R^{IV}$, $R^V$, $R^{VI}$ and $R^{VII}$ represent hydrogen, $C_{1-4}$-alkyl or halogen,
Ar is as defined above and
X, Y and Z represent a direct bond or bridge members corresponding to the formulae

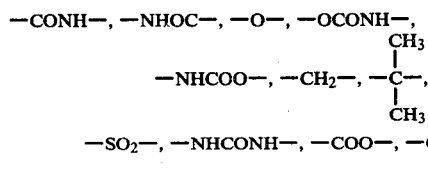

with a relative viscosity of $\geq 1.4$, as measured on a 0.5% N-methyl pyrrolidone solution at a temperature of 20° C.

In formulae (I) to (IV), the substituents have the following, preferred meanings: R represents hydrogen or methyl and R' and R" represent hydrogen, whereas Ar represents an m- or p-phenylene radical. At the same time, R, R", $R^{IV}$ and $R^{VI}$ represent hydrogen, methyl or chlorine and R', R''', $R^V$ and $R^{VII}$ represent hydrogen. X in formula (II) is preferably —O—, —CONH— or —NHOC—. X and Y in formula (III) are preferably —O—, —NHOC—, —CONH—, —NHCOO—, —COO—, —OOC—, —NHCONH— or combinations of these bridge members.

In formula (IV) X and Y are preferably —O—, —CONH— or —NHCO— and Z is —SO$_2$— or

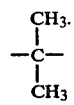

In the context of the invention, copolyamides are co-condensates of aromatic diamines and aromatic dicarboxylic acid dichlorides, the individual components also consisting of several aromatic rings which are attached to one another through single bonds or even through other bridge members in the form of amide structures. Accordingly, possible bridge members are inter alia ester, urea, urethane, ether, alkylene, carbonyl and —SO$_2$— structures.

The copolyamides suitable for use in accordance with the invention are produced from two or more diamines and one or more dicarboxylic acid chloride(s). The diamines used are compounds corresponding to general formulae V to VIII below:

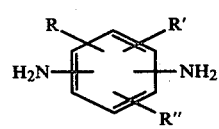

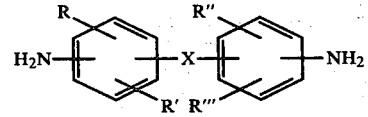

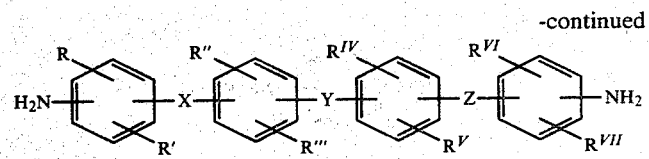

in which R, R', R",R'", $R^{IV}$, $R^V$, $R^{VI}$, $R^{VIII}$, X, Y and Z are as defined above.

Other suitable diamines are, for example, the diamines described in U.S. Pat. Nos. 2,989,495 (column 4, lines 1 to 70), 3,354,127 and 3,349,062.

In addition, the following diamines for example may be used with advantage:

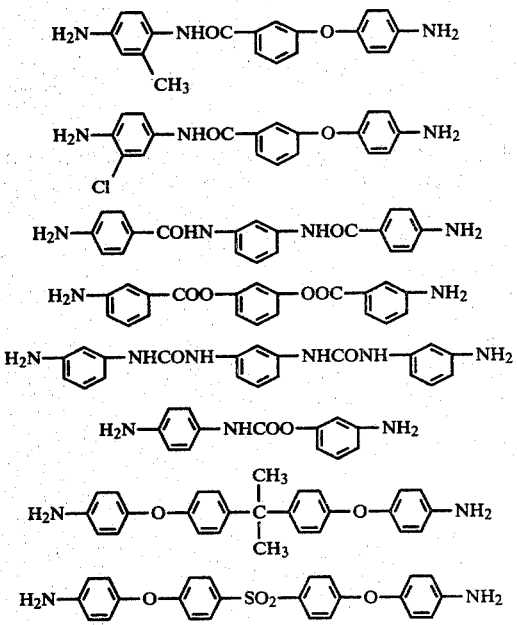

The above formulae are merely intended to indicate a number of possibilities without limiting the invention thereto.

The acid component consists of one or more aromatic dicarboxylic acid dihalide(s) corresponding to the general formula (IX)

Hal—OC—Ar—CO—Hal  (IX)

in which
Hal represents chlorine or bromine and
Ar represents an optionally alkyl- or halogen-substituted bivalent radical, but preferably m-phenylene, p-phenylene, biphenylene, naphthylene or a radical corresponding to the formula

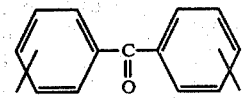

The following compounds are mentioned as specific examples: isophthalic acid dichloride, terephthalic acid dichloride, biphenyl dicarboxylic acid-4,4'-dichloride, naphthalene dicarboxylic acid-1,5-dichloride, naphthalene dicarboxylic acid-2,6-chloride, benzophenone dicarboxylic acid-4,4'-di-chloride and the corresponding dibromides, also alkyl- and halogen-substitution products of the above-mentioned acid dihalides.

Polycondensation of the described diamine and dicarboxylic acid dichloride components is carried out by methods known per se, such as interfacial polycondensation, but preferably by solution polycondensation in polar organic solvents, such as N,N-dialkyl acid amides, preferably N,N-dimethyl acetamide or N-alkyl-substituted lactams, preferably N-methyl pyrrolidone, or in tetramethyl urea, hexamethyl phosphoric acid triamide or in mixtures of these polar aprotic solvents, in the absence of additional acid acceptors, but optionally in the presence of solution promoters, such as alkali metal or alkaline earth metal halides, where they are required for keeping the copolyamides formed in solution. The condensation reaction is carried out at temperatures of from $-30°$ to $+150°$ C. and preferably at temperatures of from $-20°$ to $+30°$ C. The reaction times may be between 1 and 30 hours. The solution has a solids content of from 5 to 40%, preferably from 15 to 25%. In order to obtain reaction products with as high a molecular weight as possible, it is best to use the sum of the diamines and the dicarboxylic acid dichloride component in equimolar quantities, although basically the polycondensation reaction may also be carried out with either an excess or deficiency of the dicarboxylic acid dichloride. The dicarboxylic acid dichloride may be added to the solution or suspension of the diamines in the solvent in several small portions over a prolonged period. In some cases, however, it is advisable to add all the dicarboxylic acid dichloride at once, preferably with cooling.

Most of the aromatic copolyamides used in accordance with the invention for the production of membranes are soluble in polar organic solvents, such as N,N-dimethyl formamide, N,N-dimethyl acetamide and N-methyl pyrrolidone, at least when a few percent of an alkali metal or alkaline earth metal salt, such as calcium chloride or lithium chloride, is added as solution promoter. These copolyamides may readily be processed by known methods into asymmetrical membranes or hollow filaments.

The membranes produced from the copolyamides used in accordance with the invention have an anisotropic or asymmetrical structure. Asymmetrical membranes according to Loeb and Sourirajan are characterised by the following structure: a homogeneous and dense membrane layer of minimal thickness (0.1–0.5μ) changes substantially continuously into an underlayer with a porous structure which acts as carrier or supporting layer and has no influence upon the filtration properties. By contrast, the dense side of the membrane represents the actual selective separation layer which allows economic throughflow rates by virtue of its minimal thickness. The asymmetry of the structure is a result of the production process. In the production process, a casting solution of the polymer is prepared in a suitable solvent. A film is then cast from this solution and subjected to a heat treatment, during which the solvent partly evaporates and the asymmetrical structure is formed. Thereafter the polymer film is coagulated in a non-solvent, the structure preformed during the heat treatment being consolidated.

The process by which the membranes are produced comprises the following stages:

1. 5 to 35% by weight of the polymer product, based on the weight of the polymer and solvent, are dissolved in a polar aprotic solvent in the presence of from 1 to 10% by weight of an alkali metal or alkaline-earth metal salt, preferably LiCl, LiBr, LiNO$_3$, CaCl$_2$, CaBr$_2$. Preferred solvents are dimethyl formamide, dimethyl acetamide, N-methyl pyrrolidone, dimethyl sulphoxide, hexamethyl phosphoric acid triamide and mixtures thereof. Heat may optionally be applied to accelerate dissolution. The solution is then filtered.
2. The solution thus prepared is applied to a glass or metal substrate or to any other suitable substrate, for example a moving belt or a drum, in a layer thickness of from 150 to 500μ.
3. This film is then subjected to a heat treatment at a certain temperature for a certain time. The film is preferably heat-treated at a temperature of from 40° to 150° C. over a period of from 2 to 60 minutes.
4. After a cooling phase of 10 minutes, the film is immersed in a coagulation bath and left there for 30 minutes. Suitable coagulation liquids are solvents of the type which are miscible with the organic solvent and, at the same time, are able to dissolve the salt, but which represent a non-solvent for the polymer. Suitable solvents of this type are water, methanol, ethanol and i-propanol. Water is preferably used as the coagulation liquid. The temperature of the coagulation bath may be between 0° and 50° C. although it is preferably in the range from 0° to 25° C.

The invention also provides a process for the production of semipermeable membranes by heat treating a film produced from a polymer casting solution, the solvent being partly evaporated, and subsequently coagulating the polymer film in a non-solvent, characterised by the fact that from 5 to 35% by weight, based on the weight of copolyamide and solvent, of an aromatic copolyamide of (A) 10 to 90, preferably 50 to 85 mole % of units corresponding to the formula

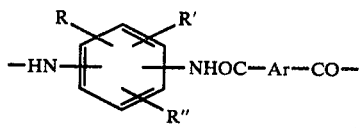

in which
R, R' and R" represent hydrogen, C$_{1-4}$-alkyl, preferably methyl, or halogen and
Ar represents an optionally alkyl- or halogen-substituted bivalent aromatic radical, preferably phenylene, naphthylene, biphenylene or a radical of the formula

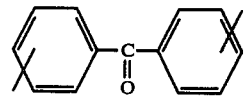

and of
(B) 10 to 90, preferably 15 to 50 mole % of units corresponding to formula II, III or IV below

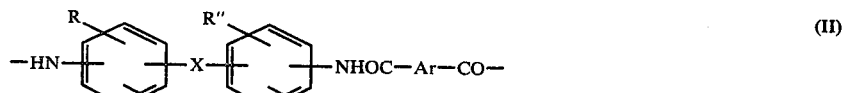 (II)

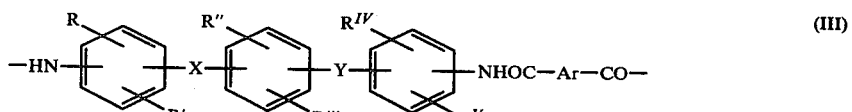 (III)

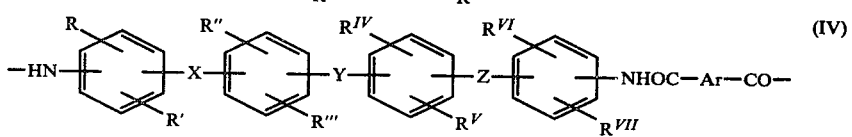 (IV)

in which
R, R', R", R''', R$^{IV}$, R$^V$, R$^{VI}$ and R$^{VII}$ represent hydrogen, C$_{1-4}$-alkyl or halogen,
Ar is as previously defined, and
X, Y and Z represent a direct bond or bridge members corresponding to the formulae

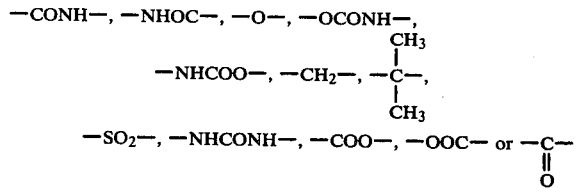

with a relative viscosity of ≧1.4, as measured on a 0.5% solution in N-methyl pyrrolidone at a temperature of 20° C., are dissolved, optionally under heat, in an aprotic solvent, such as dimethyl formamide, dimethyl acetamide, N-methyl pyrrolidone, dimethyl sulphoxide and hexamethyl phosphoric acid-tris-amide or mixtures thereof, optionally in the presence of from 1 to 10% by weight of LiCl, LiBr, LiNO$_3$, MgCl$_2$, CaCl$_2$ or CaBr$_2$, or in the presence of an organic amine, such as triethylamine, tripropylamine, pyridine or ethanolamine, the solution thus formed is optionally filtered and applied to a substrate in a layer thickness of from 150 to 500μ, the film thus formed is treated at a temperature of from 40° to 150° C. for a period of from 2 to 60 minutes and, after a cooling phase of 10 minutes, the film is immersed for 30 minutes at 0° to 50° C. in a coagulation bath which is miscible with the aprotic solvent, which optionally contains added salt and which represents a non-solvent for the copolyamide.

The membranes according to the invention may be used in the form of flat membranes, in tubular form or even in the form of hollow fibres both for inverse osmosis and for ultrafiltration. The techniques used for producing tubular structures or hollow fibres correspond accordingly to the process according to the invention.

The moisture absorption capacity of the polymers was determined on approximately 40μ thick symmetrical films. To this end, the films were washed at 30° C., dried and, for moisture absorption, were exposed for 24 hours to an atmosphere of 20° C./65% relative air humidity. The films or fibres were then dried in vacuo at 80° C. The moisture absorption is expressed as the equilibrium absorption in % of the weight of the absolutely dry films or fibres.

In order to determine the effectiveness of the membranes, the finished membrane is applied to a porous sintered plate of metal, on which a piece of filter paper has been placed, and is introduced into a pressure osmosis apparatus in which a 3.5% NaCl-solution is pumped in a circuit past the surface of the membrane at room temperature and under a pressure of 110 bars. The pumping rate amounts to 15 l/h. The throughput of water through the membrane is determined and the NaCl-content measured in the usual way.

EXAMPLE 1

A copolyamide with a relative viscosity $\eta_{rel.}$ of 1.43, as measured on a 0.5% solution of the polyamide in N-methyl pyrrolidone at 20° C. (the viscosities in the following Examples were measured under the same conditions) was produced by solution polycondensation, with N,N-dimethyl acetamide as solvent, from 40.0 parts by weight of m-phenylene diamine, 10.4 parts by weight of a diamine with the following structure

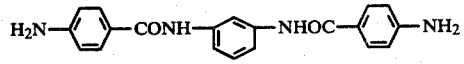

and 81.2 parts by weight of isophthalic acid dichloride. The moisture absorption capacity of this copolyamide amounted to 5.4%.

A clear solution was prepared with stirring under heat (60° C.) from 13.5 g of the polymer, 3.4 g of LiNO$_3$ and 50.6 g of N-methyl pyrrolidone. A casting solution ready for use was obtained after filtration and the removal of residual air bubbles. A film was applied to a glass plate in a thickness of 250μ and then heated for 20 minutes at 80° C. on a heating plate. After a cooling phase of 10 minutes, the film was immersed in an ice/water bath and left there for 30 minutes, during which time the film detaches itself from the glass plate. The film was stored in water at room temperature. Under the conditions defined above, this membrane had a water throughflow of 197 l/m$^2$d and a salt retention capacity of 98.8%.

EXAMPLE 2

A copolyamide with a relative viscosity $\eta_{rel.}$ of 1.66 was produced by the same method from 18.4 parts by weight of m-phenylene diamine, 9.9 parts by weight of diamine with the following structure

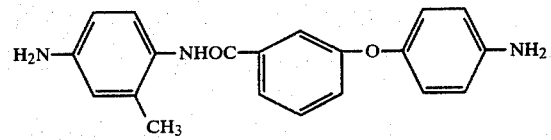

and 40.6 parts by weight of isophthalic acid dichloride. The moisture absorption capacity amounted to 4.9%.

A solution containing 15 g of the polymer, 3 g of CaCl$_2$ and 72 g of N-methyl pyrrolidone was prepared. A film cast in a thickness of 250μ was treated for 20 minutes at a temperature of 80° C. The membrane thus produced was tested and produced a throughflow of 160 l/m$^2$d and a salt rejection of 95.2%.

A film 250μ thick was produced from a solution containing 10 g of the same polymer, 2.5 g of LiNO$_3$ and 87.5 g of N-methyl pyrrolidone, and treated for 15 minutes at a temperature of 70° C. Under the test conditions mentioned above, this membrane had a throughflow of 100 l/m$^2$d and a salt rejection of 98.8%.

EXAMPLE 3

10 g of a copolyamide with a relative viscosity $\eta_{rel.}$ of 1.79 and a moisture absorption capacity of 6.1% (produced from 16.2 parts by weight of m-phenylene diamine, 16.7 parts by weight of a diamine with the following structure

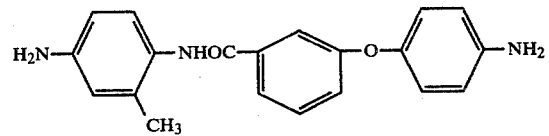

and 40.6 parts by weight of isophthalic acid dichloride), 2.5 g of LiNO$_3$ and 87.5 g of N-methyl pyrrolidone were dissolved. A film 250μ thick was produced from this casting solution and treated for 20 minutes at a temperature of 70° C. This membrane had a throughflow of 120 l/m$^2$d and a salt rejection of 99.6%.

EXAMPLE 4

A copolyamide was produced from 5.4 parts by weight of m-phenylene diamine, 15.9 parts by weight of a diamine with the following structure

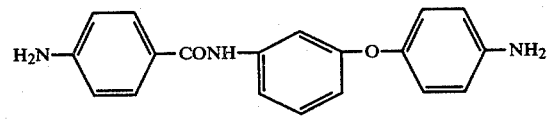

and 20.3 parts by weight of isophthalic acid dichloride. The moisture absorption capacity amounted to 5.1%.

A solution was prepared from 12.6 g of the polyamide, 3.1 g of LiNO$_3$ and 84.3 g of N-methyl pyrrolidone. A film cast in a thickness of 250μ was treated for 10 minutes at 90° C. The membrane produced the following test results: a throughflow of 85 l/m$^2$d for a salt rejection of 99.6%.

COMPARISON EXAMPLE

A poly-(m-phenylene isophthalic acid amide) with a relative viscosity of 2.02 was produced under standard conditions from 10.8 parts by weight of m-phenylene diamine and 20.3 parts by weight of isophthalic acid dichloride. A moisture absorption capacity of 3.8% was determined.

A film with a thickness of 250μ was cast from a casting solution of 10 g of the polymer, 2.5 g of LiCl and 47.5 g of N,N-dimethyl acetamide, and heated for 20 minutes to 110° C. A throughflow of 72 l/m²d and a salt retention capacity of 95.8% were measured.

Compared with the other Examples, this result clearly shows the importance of a certain water absorption capacity to the effectiveness of polymer membranes in terms of a high water throughflow coupled with a high separation capacity.

What is claimed is:

1. A porous semipermeable membrane for inverse osmosis and ultra filtration of highly-concentrated salt solutions consisting essentially of a fully aromatic copolyamide of
   (A) 10 to 90% of units corresponding to the formula (I)

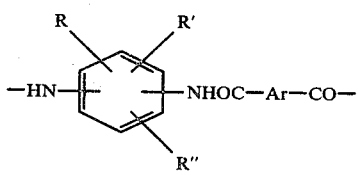

in which
   R, R' and R" which may be the same or different represent hydrogen, $C_{1-4}$-alkyl, or halogen, and
   Ar represents an alkyl- or halogen-substituted byvalent aromatic radical or an unsubstituted aromatic radical and of
   (B) 10 to 90 mole % of units corresponding to formulae II or IV below

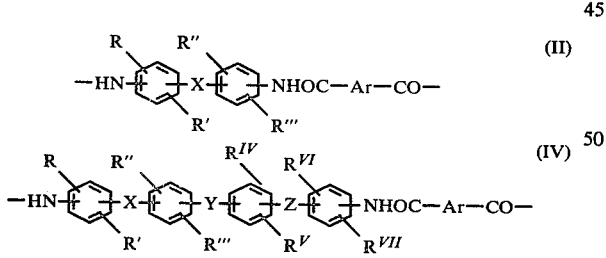

in which
   R, R', R", R'", $R^{IV}$, $R^V$, $R^{VI}$ and $R^{VII}$ which may be the same or different represent hydrogen, $C_{1-4}$-alkyl or halogen,
   Ar is as just defined, and
   X, Y and Z which may be the same or different represent a direct bond or a bridge member corresponding to a member selected from the group consisting of

—CONH—, —NHOC—, —O—,
—OCONH—, —NHCOO—, —CH$_2$—,

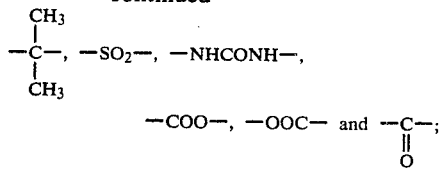

—COO—, —OOC— and —C—;
                              ‖
                              O the physical properties of said membrane being a water absorption capacity of from 4.5 to 10% by weight, measured on approximately 40μ thick films at room temperature and at 65% relative air humidity; a through-flow of at least 80 l/m²d for a desalination level of at least 85% as measured in a pressure osmosis apparatus in which a 3.5% NaCl-solution is pumped in a circuit past the surface of the membrane at room temperature under a pressure of 110 bars at a rate of 15 l/h and consisting of a fully aromatic copolyamide with a relative viscosity of ≧1.4, as measured on a 0.5% N-methyl pyrrolidone solution at 20° C.

2. A semipermeable membrane as claimed in claim 1, having a throughflow of 85 to 200 l/m²d for a desalination level of 95 to 99.6%, as measured in a pressure osmosis apparatus in which a 3.5% NaCl-solution is pumped in a circuit past the surface of the membrane at room temperature under a pressure of 110 bars at a rate of 15 l/h.

3. A semipermeable membrane as claimed in claim 1, consisting of 50 to 85 mole % of the units A and 15 to 50 mole % of the units B.

4. A semipermeable membrane as claimed in claim 1 wherein the alkyl group represented by one or more of R, R' and R" is methyl.

5. A semipermeable membrane as claimed in claim 1, wherein Ar represents an alkyl- or halogen-substituted or unsubstituted bivalent aromatic radical which is phenylene, naphthylene, biphenylene or a radical of the formula

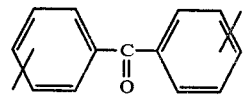

6. A semipermeable membrane as claimed in claim 1, consisting of a copolyamide of
   (A) 10 to 90 mole % of units corresponding to the formula (I) in which
   R represents hydrogen or methyl and
   R' and R" represent hydrogen and
   Ar is an m- or p-phenylene radical, and of
   (B) 10 to 90 mole % of units corresponding to formulae (II), (III) and (IV) in which
   R, R", $R^{IV}$ and $R^{VI}$ which may be the same of different represent hydrogen, methyl or chlorine,
   R', R'", $R^V$ and $R^{VII}$ represent hydrogen and
   Ar represents the m- or p-phenylene radical.

7. A semipermeable membrane as claimed in claim 6, consisting of 50 to 85 mole % of the units (A) and 15 to 50 mole % of the units (B).

8. A semipermeable membrane as claimed in claim 1, wherein X in formula (II) represents —O—, —CONH— or —NHOC—.

9. A semipermeable membrane as claimed in claim 1, wherein X and Y in formula (III) which may be the same or different represent —O—, —NHOC—, —COHN—, NHCOO—, —COO—, —OCC— or —NHCONH— or a combination of these radicals.

10. A semipermeable membrane as claimed in claim 1, wherein X and Y in formula (IV) which may be the same or different represent —O—, —CONH— or —NHOC— and Z represents —SO$_2$— or

11. A semipermeable membrane as claimed in claim 1, consisting of a copolyamide of 10 to 90 mole % of units of the formula:

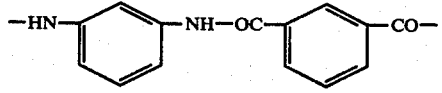

and 90 to 10 mole % of units of the formula:

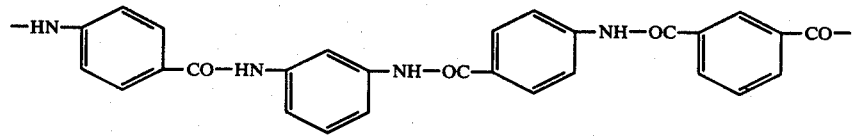

12. A semipermeable membrane as claimed in claim 1, consisting of a copolyamide of 10 to 90 mole % of units corresponding to the formula:

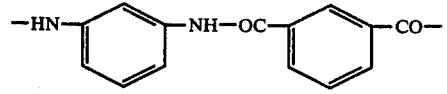

and 90 to 10 mole % of units corresponding to the formula:

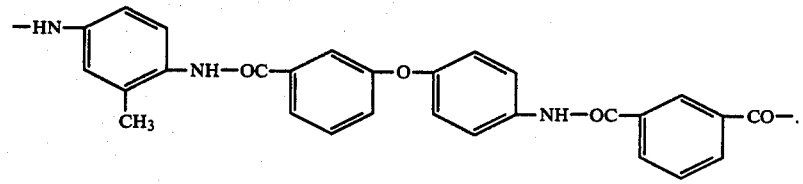

13. A semipermeable membrane as claimed in claim 1, consisting of 10 to 90 mole % of units corresponding to the formula:

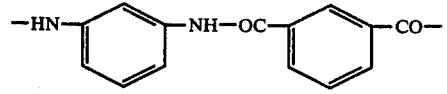

and of 90 to 10 mole % of units corresponding to the formula:

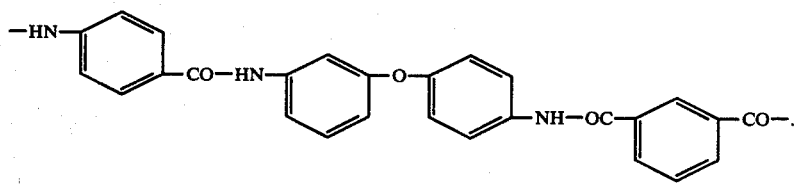

* * * * *